March 27, 1951        B. E. MILLS        2,546,768
BOILER SCALING TOOL
Filed Oct. 29, 1947
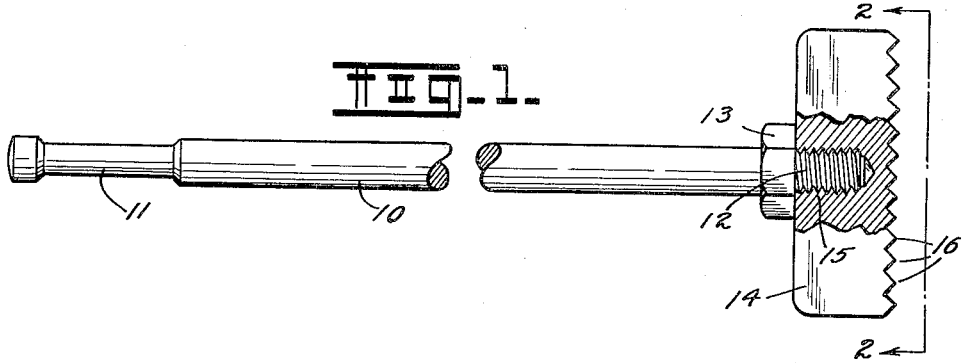
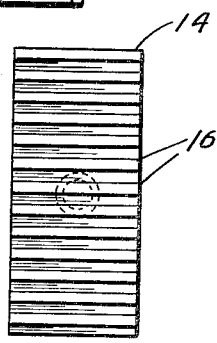
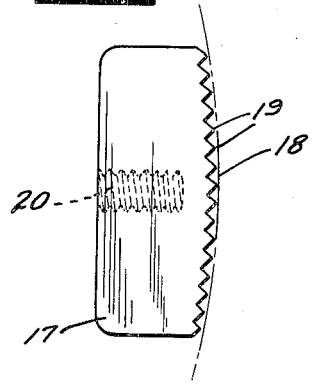
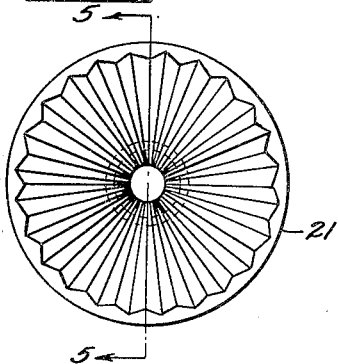
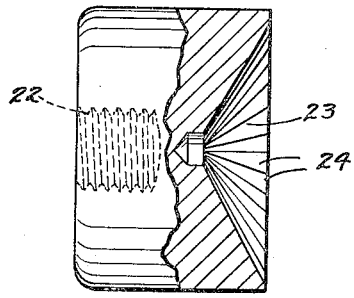
INVENTOR.
Blair E. Mills.
BY W. B. Harpman
ATTORNEY.

UNITED STATES PATENT OFFICE 2,546,768

BOILER SCALING TOOL

Blair E. Mills, Lowellville, Ohio

Application October 29, 1947, Serial No. 782,770

1 Claim. (Cl. 29—81)

This invention relates to tools and more particularly to tools adapted for use in removing scale from a boiler.

The principal object of the invention is the provision of a set of scale removing tools.

A further object of the invention is the provision of a set of scale removing tools adapted for use with a pneumatic reciprocating tool.

A still further object of the invention is the provision of a scale removing tool having a plurality of cutters arranged in parallel relation to one another.

A still further object of the invention is the provision of a scale removing tool having an arcuate face and a plurality of cutters positioned in parallel relation to one another thereon.

A still further object of the invention is the provision of a scale removing tool having a plurality of radially spaced inclined cutters for selective registry with rounded objects such as rivets and the like.

A still further object of the invention is the provision of a scale removing tool having a plurality of interchangeable cutter carrying heads for registry with various straight and curved surfaces of a boiler from which the scale is to be removed.

The scale removing tools shown and described herein make possible the rapid and efficient removal of scale from boiler surfaces particularly when used in connection with a pneumatic gun for imparting rapid reciprocating movement to the scale removing tools. The formation of scale in boilers has long been recognized as a factor increasing the cost of operation of the boiler as the scale forms an insulating wall seriously affecting heat conduction and at the same time blocking the various fluid passageways in the boiler. It has therefore long been recognized that periodic removal of the scale from the boiler is essential. In the past such removal of scale has generally been accomplished by the use of a chipping hammer which necessitated a slow and costly scale removing operation.

The present invention relates to scale removing tools which are adapted to be used with pneumatic guns or electric reciprocating guns and each of the tools will remove a relatively wide area of scale from a boiler wall surface in a very short time by reason of the formation of a plurality of spaced cutters comprising the scale engaging surfaces of the tools. The tools are arranged so that alternate heads may be used thereby enabling the operator to choose the type of head matching the contour of the boiler wall being cleaned.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:

Figure 1 is a side elevation of a scale removing tool with parts broken away and parts in cross section.

Figure 2 is an end elevation of the scale removing tool shown in Figure 1 and taken on line 2—2 thereof.

Figure 3 is a side elevation of a modified form of scale removing tool.

Figure 4 is an end elevation of a further modified form of a scale removing tool.

Figure 5 is a side elevation of the scale removing tool illustrated in Figure 4 with parts broken away and parts in cross section as taken on line 5—5 of Figure 4.

By referring to the drawings and Figures 1 and 2 in particular it will be seen that a scale removing tool has been disclosed which comprises a shaft 10 having an area 11 of reduced diameter near one end thereof and forming means by which the shaft 10 may be engaged by a reciprocating tool such as a pneumatic gun. The other end of the shaft 10 is threaded, as indicated by the numeral 12, and is provided with a lock nut 13. A scale removing head 14 is threadably engaged upon the threaded end 12 of the shaft 10 as it is provided with a drilled and tapped socket 15 for such engagement. The face of the head 14 is provided with a plurality of transversely positioned spaced cutters 16, as best shown in Figure 2 of the drawings. It will thus be seen that when the head 14 is assembled on the threaded end 12 of the shaft 10 and a lock nut 13 tightened thereagainst, the shaft 10 and head 14 become a unit which may be installed in a reciprocating tool such as a pneumatic gun and the same effectively used in removing scale from the inner surface of a boiler and the like.

The provision of the plurality of parallel cutters 16 spaced with respect to one another results in the simultaneous removal of scale from a relatively wide area of the boiler as each of the cutters 16 act as a chipping hammer and, in cooperation with the adjacent cutters 16, rapidly cuts away scale from the boiler wall surface.

It will be obvious to those skilled in the art that many boiler surfaces are curved or rounded and a modified form of the scale removing head of the tool has been provided for placement on the end of the shaft 10 for cleaning such rounded or curved boiler surfaces. In Figure 3 of the drawings a side elevation of the modified form of the head is disclosed and the same is indicated therein by the numeral 17. The scale engaging surface thereof is formed in an arc 18 and the arcuate surface 18 has a plurality of cutters 19 formed transversely thereof in spaced relation to one another. A drilled and tapped socket 20 enables the threaded end 12 of the shaft 10 to be engaged in the arcuate shaped head 17.

It will thus be seen that a simple and efficient scale removing tool has been disclosed which will, when operated by a reciprocating tool such as a pneumatic gun, rapidly and efficiently remove scale from boiler surfaces.

Having thus described my invention, what I claim is:

A scale removing tool comprising a rectangular head, the said head having an outwardly bowed front surface, a plurality of sharp ridges formed integrally in said outwardly bowed front surface at right angles to the plane of the said arc.

BLAIR E. MILLS.

REFERENCES CITED

The following references are of record in the file of this patent:

UNITED STATES PATENTS

| Number | Name | Date |
|---|---|---|
| 521,695 | Armstrong | June 19, 1894 |
| 761,153 | Durkee | May 31, 1904 |
| 848,459 | Grant | Mar. 26, 1907 |
| 949,513 | Zein | Feb. 15, 1910 |
| 1,645,317 | Carrol | Oct. 11, 1927 |
| 1,727,915 | Thomson | Sept. 10, 1929 |
| 1,913,267 | Deyo | June 6, 1933 |
| 2,099,677 | Cunningham | Nov. 23, 1937 |
| 2,136,595 | Rogers | Nov. 15, 1938 |
| 2,335,150 | Johnson | Nov. 23, 1943 |
| 2,427,417 | Prickett | Sept. 16, 1947 |

FOREIGN PATENTS

| Number | Country | Date |
|---|---|---|
| 753,705 | France | Aug. 12, 1933 |